United States Patent
Yajima et al.

(10) Patent No.: US 11,772,215 B2
(45) Date of Patent: Oct. 3, 2023

(54) MAGNETIC CHUCK

(71) Applicant: SMC CORPORATION, Chiyoda-ku (JP)

(72) Inventors: Hisashi Yajima, Tsukuba (JP); Motohiro Sato, Toride (JP); Tsuyoshi Sasaki, Tsukubamirai (JP); Koji Hara, Tsukubamirai (JP); Kouichirou Kanda, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 403 days.

(21) Appl. No.: 17/044,597

(22) PCT Filed: Mar. 27, 2019

(86) PCT No.: PCT/JP2019/013303
§ 371 (c)(1),
(2) Date: Oct. 1, 2020

(87) PCT Pub. No.: WO2019/194049
PCT Pub. Date: Oct. 10, 2019

(65) Prior Publication Data
US 2021/0023665 A1    Jan. 28, 2021

(30) Foreign Application Priority Data

Apr. 5, 2018  (JP) ................. 2018-073229

(51) Int. Cl.
*B23Q 3/154*    (2006.01)
*H01F 7/02*     (2006.01)

(52) U.S. Cl.
CPC ......... *B23Q 3/1546* (2013.01); *H01F 7/0252* (2013.01); *B23Q 2703/02* (2013.01)

(58) Field of Classification Search
CPC . B23Q 3/1546; B23Q 2703/02; H01F 7/0252; H01F 7/04; H01F 7/02;
(Continued)

(56) References Cited

U.S. PATENT DOCUMENTS 3,079,191 A    2/1963  Engelsted et al.
4,121,865 A *  10/1978  Littwin, Sr. ........... B66C 1/0231
                                                      414/797
(Continued)

FOREIGN PATENT DOCUMENTS

CN    103697099 A     4/2014
CN    104816309 A *   8/2015  ....... B23B 31/16287
(Continued)

OTHER PUBLICATIONS

International Search Report dated Jun. 11, 2019 in PCT/JP2019/013303 filed on Mar. 27, 2019, 2 pages.
(Continued)

*Primary Examiner* — Mohamad A Musleh
(74) *Attorney, Agent, or Firm* — Oblon, McClelland, Maier & Neustadt, L.L.P.

(57) ABSTRACT

A magnetic chuck has a piston assembly that contains a cylindrical permanent magnet and a core yoke. The piston assembly is movable inside a cylinder tube. The permanent magnet is provided on the outer periphery of the core yoke and is magnetized in the radial direction.

8 Claims, 11 Drawing Sheets

(58) Field of Classification Search
CPC .... B25J 15/0608; B25J 15/0683; B25J 15/06; F16B 47/00; F16B 1/00; F16B 2001/0035; B65G 47/92; B66C 1/04
See application file for complete search history.

(56) References Cited

U.S. PATENT DOCUMENTS

| | | | | |
|---|---|---|---|---|
| 6,015,175 | A * | 1/2000 | Carruth | B66C 1/04 294/192 |
| 6,086,125 | A * | 7/2000 | Kovacs | B66C 1/04 294/192 |
| 2005/0134063 | A1* | 6/2005 | Jacobs | B65G 47/92 294/2 |
| 2016/0184981 | A1* | 6/2016 | Kanda | B23Q 3/1546 269/8 |
| 2016/0189844 | A1* | 6/2016 | Yajima | H01F 7/0257 335/285 |

FOREIGN PATENT DOCUMENTS

| | | |
|---|---|---|
| CN | 105960686 A | 9/2016 |
| JP | 51-102174 U | 8/1976 |
| JP | 2016-124096 A | 7/2016 |
| JP | 2017-164855 A | 9/2017 |

OTHER PUBLICATIONS

Combined Chinese Office Action and Search Report dated Mar. 7, 2022 in Patent Application No. 201980024219.6 (with partial English language translation and English translation of Category of Cited Documents), 8 pages.

* cited by examiner

MAGNETIC CHUCK

TECHNICAL FIELD

The present invention relates to a magnetic chuck that attracts and holds a workpiece by means of a force of a permanent magnet.

BACKGROUND ART

Magnetic chucks are conventionally known in which a permanent magnet is joined to a piston inside a cylinder and displaced together with the piston (for example, refer to Japanese Laid-Open Utility Model Publication No. 51-102174). In such a magnetic chuck, as the piston is displaced by a fluid pressure, the permanent magnet comes close to the workpiece and attracts and holds the workpiece. The workpiece is released when the piston is displaced in the direction away from the workpiece.

Attracting a heavy workpiece with a magnetic chuck requires an increased attracting force, but increasing the attracting force is not easy if the workpiece is a thin plate, because magnetic saturation occurs inside the workpiece. Further, simply choosing a permanent magnet having a large magnetic force leads to an increase in size of the device.

The applicant of the present invention has proposed a technique for configuring a magnetic chuck using a permanent magnet so that an increased magnetic flux passes in the workpiece to exert a larger attracting force on the workpiece (refer to Japanese Laid-Open Patent Publication No. 2016-124096). In the magnetic chuck, a plurality of permanent magnets are arranged in such a manner that one or more sets of a north pole and a south pole exist at the surface that faces the workpiece.

SUMMARY OF INVENTION

Magnetic chucks are desired which can further increase the magnetic flux passing in the workpiece so as to hold the workpiece with as large an attracting force as possible.

The present invention has been devised considering such circumstances, and an object of the present invention is to provide a magnetic chuck capable of attracting and holding a workpiece with as large a magnetic attraction force as possible.

The present invention provides a magnetic chuck in which a piston assembly including a tubular permanent magnet and a core yoke is provided movably inside a cylinder tube, wherein the permanent magnet is provided around the core yoke and is magnetized in a radial direction.

According to the magnetic chuck above, the core yoke as a ferromagnetic body is disposed on the side of the inner periphery of the permanent magnet, so that the magnetic flux from the permanent magnet can be concentrated to increase the magnetic attraction force acting on the workpiece.

In the magnetic chuck above, the permanent magnet may be configured by combining a plurality of magnet pieces. The tubular permanent magnet can then be easily obtained.

Preferably, a cover yoke is provided around the permanent magnet, and an outer yoke that faces the outer periphery of the piston assembly at a movement end of the piston assembly is provided at one end in the axial direction of the cylinder tube. This configuration further increases the magnetic attraction force acting on the workpiece. Furthermore, at the movement end of the piston assembly, the component in the travel direction of the magnetic attraction force acting between the outer yoke and the piston assembly is weakened, and therefore the air pressure required to move the piston assembly from the movement end can be made smaller.

Preferably, a bottom yoke that faces the core yoke is provided at one end in the axial direction of the cylinder tube, in which case, preferably, the bottom yoke fits into a recess of the core yoke at the movement end of the piston assembly. This configuration further increases the magnetic attraction force acting on the workpiece. Furthermore, at the movement end of the piston assembly, the component in the travel direction of the magnetic attraction force acting between the bottom yoke and the piston assembly is weakened, and therefore the air pressure required to move the piston assembly from the movement end can be made smaller.

Preferably, a latch yoke that faces the piston assembly is provided at another end in the axial direction of the cylinder tube. According to this configuration, at a movement end that is opposite to the above-mentioned movement end, the piston assembly is attracted by the latch yoke with a certain magnetic attraction force, which eliminates the fear that the piston assembly might unexpectedly move and attract the workpiece. Furthermore, in the transportation of the magnetic chuck, for example, it is possible to avoid the situation in which the magnetic chuck unexpectedly attracts neighboring iron materials etc., which ensures safety.

Preferably, a rod is joined to the piston assembly and an adjuster configured to adjust the position of the movement end of the piston assembly is provided at an end portion of the rod that is exposed to outside. It is then possible to easily adjust the magnetic attraction force for attracting and holding the workpiece.

According to the magnetic chuck of the present invention, the core yoke, as a ferromagnetic body, is provided on the side of the inner periphery of the permanent magnet, and therefore the magnetic flux from the permanent magnet can be concentrated and the magnetic attraction force acting on the workpiece can be increased.

DESCRIPTION OF EMBODIMENTS

Figure 1:
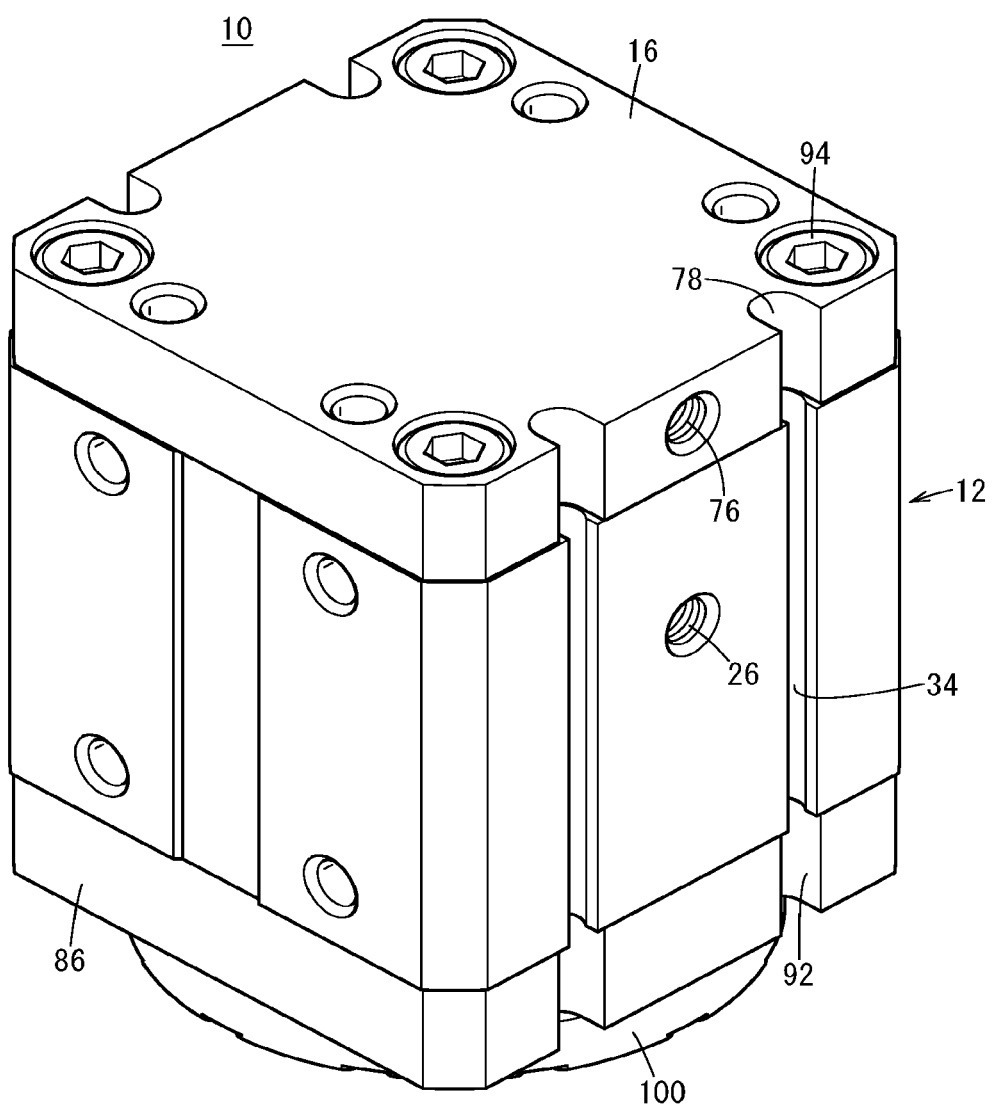
FIG. 1 is a perspective view illustrating a magnetic chuck according to a first embodiment of the present invention.

The magnetic chuck according to the present invention will be described referring to the accompanying drawings in connection with preferred embodiments.

First Embodiment

A magnetic chuck 10 of a first embodiment of the present invention will be described referring to FIGS. 1 to 9.

The magnetic chuck 10 includes a cylinder tube 12, a piston assembly 14, a top cover 16, a bottom cover 18, and a latch yoke 20. The magnetic chuck 10 is attached to an end arm of a robot not shown, for example.

The cylinder tube 12 is made of a paramagnetic metal such as an aluminum alloy. The cylinder tube 12, except a fitting portion 22 formed at the lower end of the cylinder tube 12, has a rectangular outline in transverse section, and the cylinder tube 12 hence has four side surfaces. The fitting portion 22 of the cylinder tube 12 has a circular outline in transverse section. The cylinder tube 12 has a cylinder hole 24 having a circular cross section and passing through the cylinder tube 12 along its axial direction.

Figure 5:
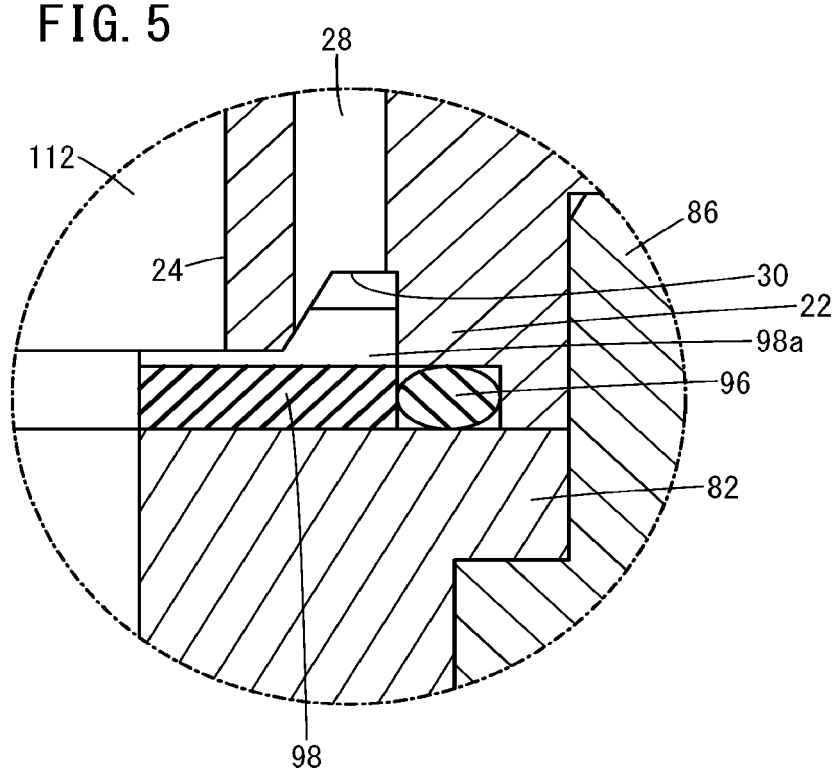
FIG. 5 is an enlarged view of part V of FIG. 2.
Figure 6:
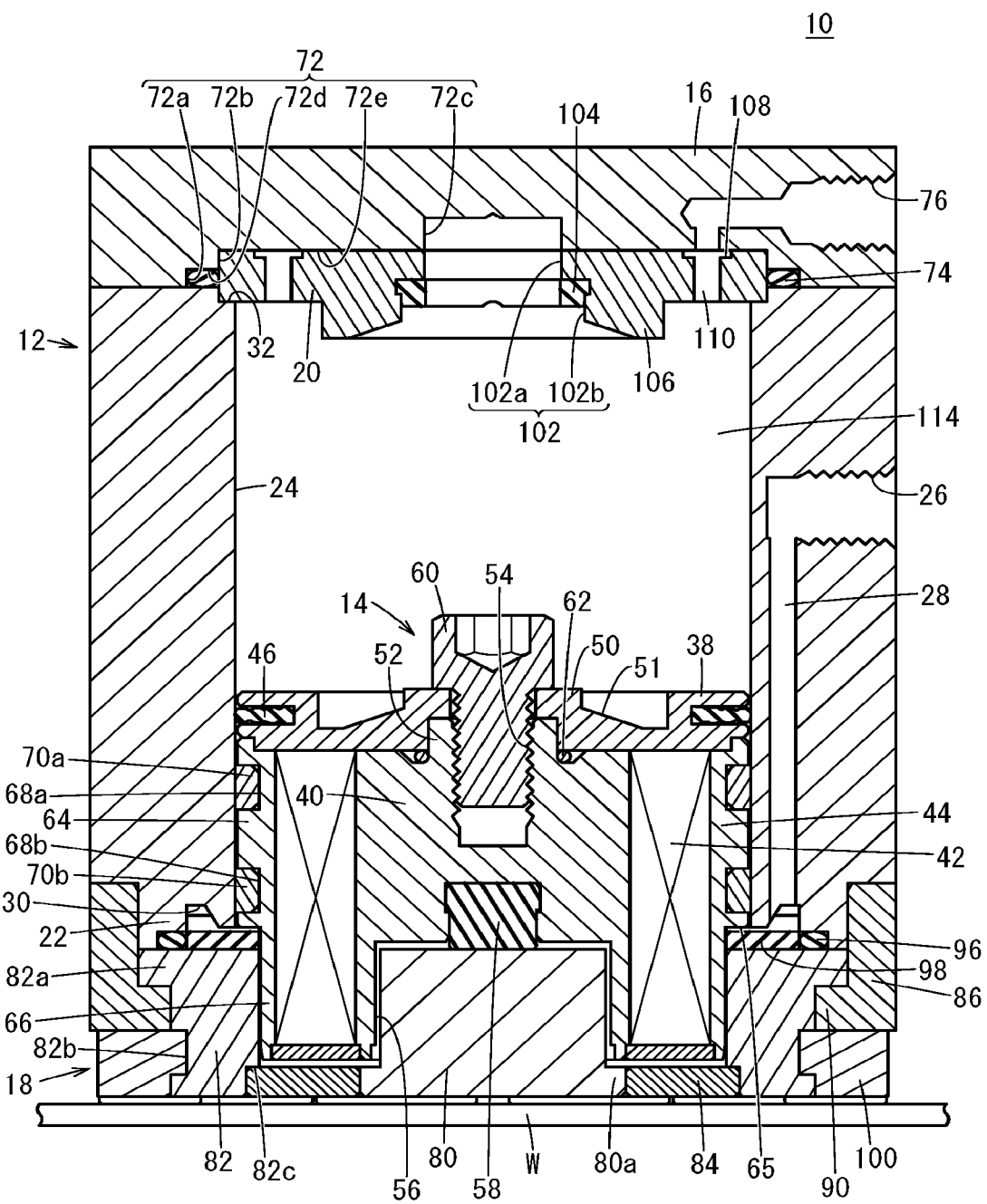
FIG. 6 is a longitudinal section of the magnetic chuck of FIG. 1, where the piston assembly is at bottom dead center.

A first port 26 for supplying and discharging air is formed in one side surface of the cylinder tube 12. The first port 26 connects to the upper end of a first air supply/discharge hole 28 extending inside the wall of the cylinder tube 12 along the axial direction. As shown in FIG. 5, an inner side of the fitting portion 22 of the cylinder tube 12 has a ring-shaped recess 30 opening downward, and the lower end of the first air supply/discharge hole 28 faces the ring-shaped recess 30.

Two attachment grooves 34 are formed in the side surface of the cylinder tube 12 in which the first port 26 opens and in the opposite side surface of the cylinder tube 12. The attachment grooves 34 extend along the axial direction of the cylinder tube 12 to reach both upper and lower ends thereof, which are used to attach a magnetic sensor not shown.

The end of the fitting portion 22 of the cylinder tube 12 has a step in which a third seal member 96, described later, is fitted. The top end of the cylinder hole 24 has a step 32 on which the latch yoke 20 is mounted. The four corners of the cylinder tube 12, where the side surfaces thereof connect, are made thicker and have insertion holes 35 into which tie rods 94, described later, are inserted.

The piston assembly 14 includes a seal holder 38, a core yoke 40, a permanent magnet 42, a cover yoke 44, and a ring plate 45.

The seal holder 38 is shaped like a disk of a paramagnetic metal such as an aluminum alloy. A piston seal 46 is fitted in a recessed groove formed along the circumference of the seal holder 38, and the piston seal 46 is in sliding contact with the wall surface of the cylinder hole 24. A through hole 48 is formed in the center of the seal holder 38, and an inward flange 50, protruding inwardly from the through hole 48, is formed at the upper end of the seal holder 38. The top surface of the seal holder 38 that faces toward the top cover 16 has a ring-shaped recess 51 formed therein.

The core yoke 40 is shaped like substantially a round pillar of a steel material being a ferromagnetic substance. A small-diameter, tubular protrusion 52 is formed in the center of the upper end of the core yoke 40. The core yoke 40 has a threaded hole 54 having a bottom and opened at the end of the tubular protrusion 52. The lower end of the core yoke 40 has formed therein a recess 56 having a circular cross section and opened downward. A first damper 58 is attached in the bottom surface of the recess 56 so as to somewhat protrude from the bottom surface. When the piston assembly 14 has descended to the bottom dead center, the first damper 58 abuts on a bottom yoke 80 and functions to alleviate the shock (see FIG. 6).

The tubular protrusion 52 of the core yoke 40 is fitted in the through hole 48 of the seal holder 38 from below until the tubular protrusion 52 abuts on the inward flange 50 of the seal holder 38, and a fixing screw 60 is put into the through hole 48 from above and inserted and screwed in the threaded hole 54 of the core yoke 40. The seal holder 38 and the core yoke 40 are thus integrally joined together. A first seal member 62 is attached around the base of the tubular protrusion 52 of the core yoke 40. The first seal member 62 provides a seal between the seal holder 38 and the core yoke 40.

Figure 4:
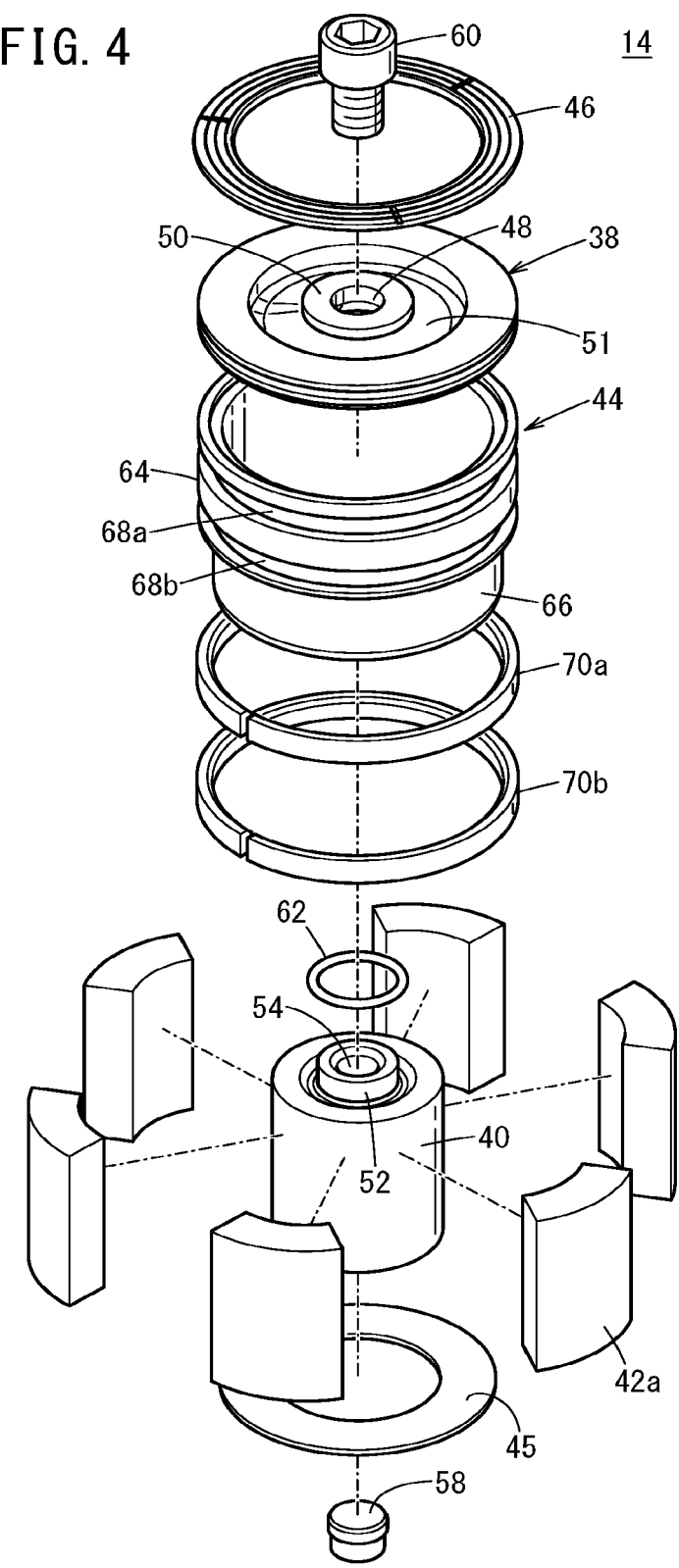
FIG. 4 is a further exploded diagram of the piston assembly of FIG. 3.

The tubular permanent magnet 42 is disposed around the core yoke 40, and is attached thereto so as to be enclosed by the seal holder 38, the core yoke 40, the cover yoke 44, and the ring plate 45. The permanent magnet 42 is magnetized in a radial direction. That is, the permanent magnet 42 has a north pole on its inner peripheral side and a south pole on its outer peripheral side. Alternatively, the south pole may be on the inner peripheral side and the north pole may be on the outer peripheral side. As shown in FIG. 4, in this embodiment, the permanent magnet 42 is shaped like a round tube by combining magnet pieces that are divided along the circumferential direction, i.e., a plurality of fan-shaped magnet pieces 42a. However, the permanent magnet 42 may be formed of a single member. Alternatively, a plurality of flat-plate-shaped magnet pieces may be combined together to form a rectangular-tube-shaped permanent magnet having a polygonal shape in transverse section. When the permanent magnet is shaped like a rectangular tube, a direction that intersects the center axis perpendicularly is referred to as the "radial direction" of the permanent magnet.

The tubular cover yoke 44 is disposed around the permanent magnet 42. The cover yoke 44 is made of a steel material being a ferromagnetic substance. The outer periphery of the cover yoke 44 has a large-diameter upper portion and a small-diameter lower portion. That is, the cover yoke 44 has a large-diameter portion 64 above a step 65 and a small-diameter portion 66 below the step 65. Two annular grooves 68a, 68b, spaced apart in the axial direction, are formed in the large-diameter portion 64. Wear rings 70a, 70b are fitted in the annular grooves 68a, 68b. The piston assembly 14 is guided and supported in the cylinder hole 24 with the wear rings 70a, 70b therebetween.

The top cover 16 is made of a paramagnetic metal such as an aluminum alloy, and is formed in the same rectangular plate shape in plan view as the outline of the cylinder tube 12. The lower surface of the top cover 16 has a circular recess 72 having two step surfaces. That is, the circular recess 72 has a large-diameter portion 72a, a middle-diameter portion 72b, and a small-diameter portion 72c from the side closer to the cylinder tube 12, with a first step surface 72d between the large-diameter portion 72a and the middle-diameter portion 72b, and a second step surface 72e between the middle-diameter portion 72b and the small-diameter portion 72c.

The middle-diameter portion 72b and the second step surface 72e serve to position the latch yoke 20. The small-diameter portion 72c allows the head of the fixing screw 60 to be accommodated therein when the piston assembly 14 rises (see FIG. 2). A ring-shaped second seal member 74 is attached in the ring-shaped gap formed by the large-diameter portion 72a and the first step surface 72d. The second seal member 74 provides a seal between the cylinder tube 12 and the top cover 16.

The top cover 16 has a second port 76 formed therein. One end of the second port 76 opens in the side surface of the top cover 16 that corresponds to the side surface of the cylinder tube 12 where the first port 26 opens. The other end of the second port 76 opens in the second step surface 72e of the top cover 16.

Grooves 78, which match the attachment grooves 34 of the cylinder tube 12, are formed in the side surface of the top cover 16 where the second port 76 opens and in the opposite side surface of the top cover 16. The grooves 78 are used to attach a magnetic sensor in the attachment groove 34 of the cylinder tube 12. Insertion holes 79, into which the tie rods 94 described later are inserted, are formed in the four corners of the rectangle-shaped top cover 16 so as to pass through the top cover 16 in the thickness direction thereof.

The bottom cover 18 includes the bottom yoke 80, an outer yoke 82, a first housing 86, and a second housing 100.

The bottom yoke 80 is shaped like a round pillar of a steel material being a ferromagnetic substance. The bottom yoke 80 fits into the recess 56 of the core yoke 40 when the piston assembly 14 descends (see FIG. 6). A bottom flange 80a, protruding radially outward, is formed at the bottom of the bottom yoke 80.

The outer yoke 82 is disposed around the bottom yoke 80. The outer yoke 82 is shaped like a round tube of a steel material being a ferromagnetic substance. An upper flange 82a, protruding radially outward, is formed at the top of the outer yoke 82, and an outer recess 82b, depressed radially inward, is formed in a lower area of the outer surface of the outer yoke 82. Further, a step 82c is formed at the inner bottom edge of the outer yoke 82.

A ring-shaped joint plate 84 is attached between the bottom flange 80a of the bottom yoke 80 and the step 82c of the outer yoke 82. The outer yoke 82 is thus fixed to the bottom yoke 80. The joint plate 84 is made of a paramagnetic metal such as an aluminum alloy.

The first housing 86 is shaped like a tube of a paramagnetic metal such as an aluminum alloy. The outline of the first housing 86 in transverse section is the same as that of the cylinder tube 12. The first housing 86 has a through hole 88 having a circular transverse section and passing therethrough vertically, and a lower flange 90 protruding inwardly at the bottom of the through hole 88. The fitting portion 22 of the cylinder tube 12 is fitted in the through hole 88 of the first housing 86.

Grooves 92, which match the attachment grooves 34 of the cylinder tube 12, are formed in a pair of opposing side surfaces of the first housing 86, among its four side surfaces. The grooves 92 are used to attach a magnetic sensor in the attachment groove 34 of the cylinder tube 12. Threaded holes 93, into which the tie rods 94 described below are screwed, are formed in the four corners of the first housing 86.

Four tie rods 94 are inserted into the insertion holes 79 of the top cover 16 and the insertion holes 35 of the cylinder tube 12, and the ends of the tie rods 94 are screwed into the threaded holes 93 of the first housing 86. The top cover 16, the cylinder tube 12, and the first housing 86 are thus joined and fixed together. The upper flange 82a of the outer yoke 82 is held between the end surface of the fitting portion 22 of the cylinder tube 12 and the lower flange 90 of the first housing 86, whereby the outer yoke 82 is also joined and fixed therewith.

The third seal member 96 is attached in the gap formed by the step at the end of the fitting portion 22 of the cylinder tube 12 and the top surface of the outer yoke 82. The third seal member 96 provides a seal between the cylinder tube 12 and the outer yoke 82.

Figure 3:
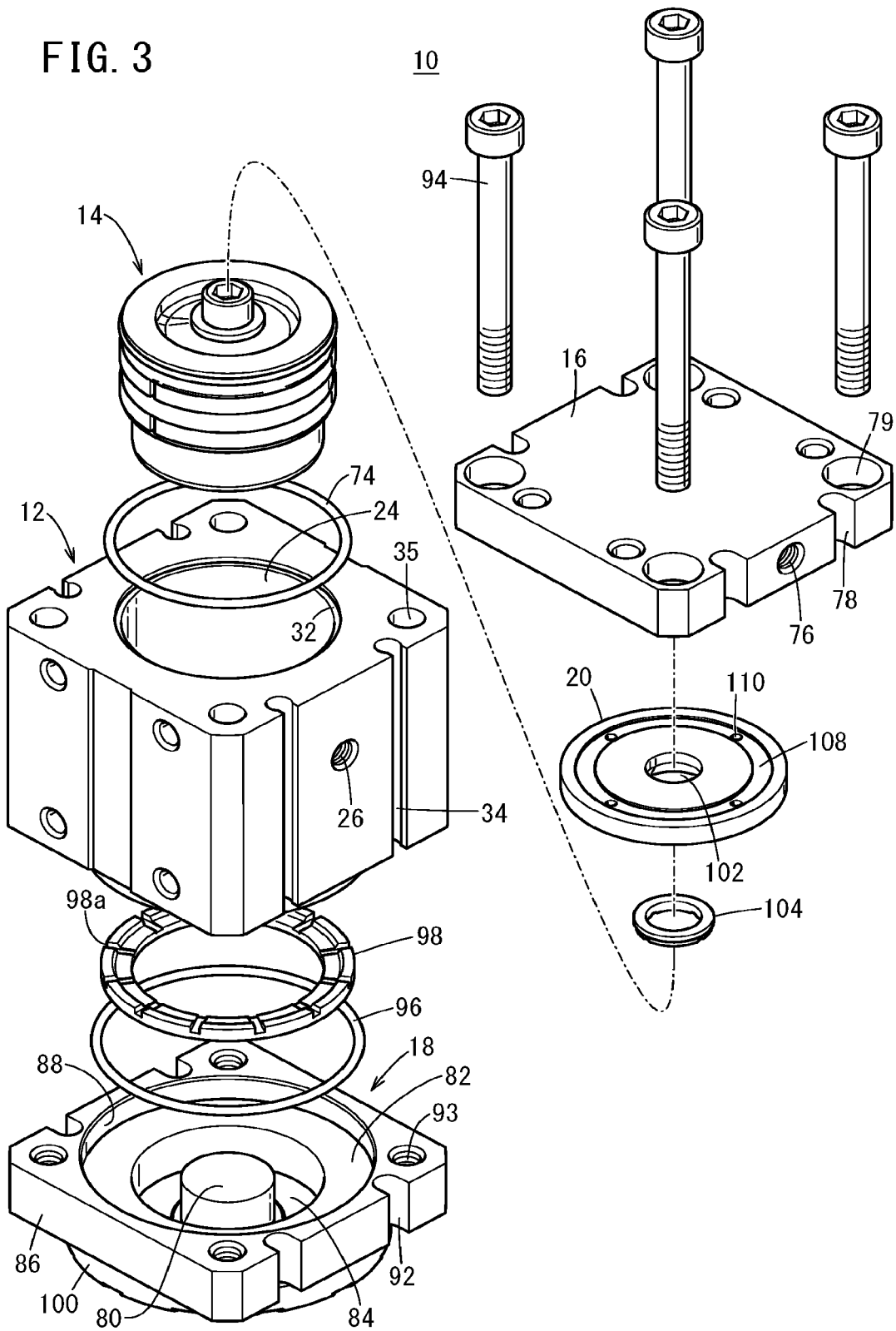
FIG. 3 is an exploded diagram of the magnetic chuck of FIG. 1.

A ring-shaped second damper 98 is attached in a position that faces the ring-shaped recess 30 of the cylinder tube 12 and that is between the bottom of the cylinder tube 12 and the top surface of the outer yoke 82. When the piston assembly 14 has descended to the bottom dead center, the second damper 98 abuts on the step 65 of the cover yoke 44 and functions to alleviate the shock. As shown in FIG. 3, the top surface of the second damper 98 has a plurality of slits 98a spaced at equal intervals along its circumference and extending from the inner edge to the outer edge. The slits 98a serve to allow the first air supply/discharge hole 28 to communicate with the cylinder hole 24.

The second housing 100 is made of a resin material or rubber material, and fitted and attached in the outer recess 82b of the outer yoke 82. The second housing 100 slightly protrudes downward beyond the bottom yoke 80 and the outer yoke 82. Accordingly, when the second housing 100 comes in contact with an iron plate (workpiece) W that is to be attracted, a small gap is formed between the plate W, and the bottom yoke 80 and outer yoke 82.

Figure 2:
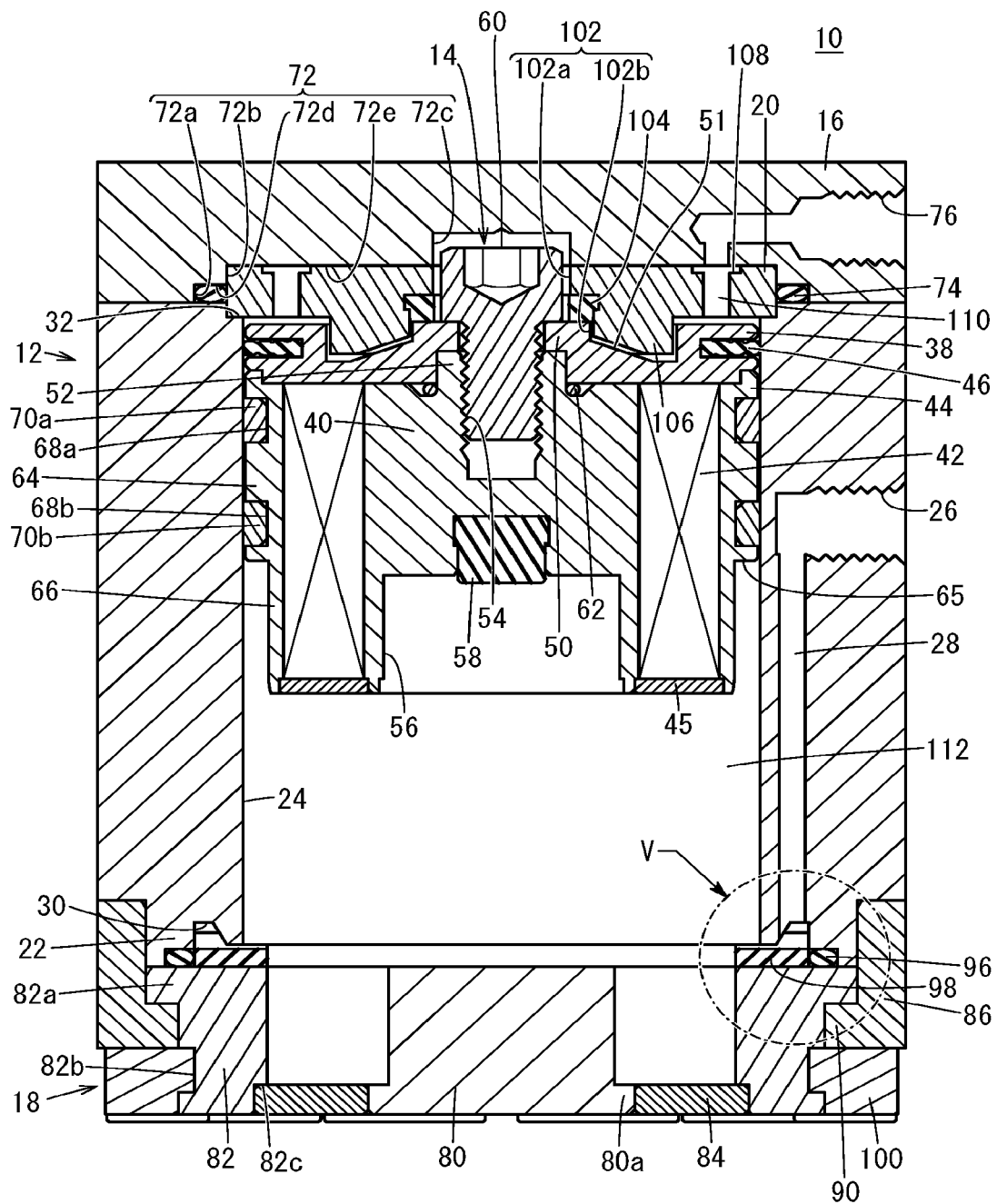
FIG. 2 is a longitudinal section of the magnetic chuck of FIG. 1, where a piston assembly is at top dead center.

The latch yoke 20 is shaped like a disk of a steel material being a ferromagnetic substance, and is disposed in the circular recess 72 of the top cover 16 and on the step 32 of the top edge of the cylinder hole 24. The latch yoke 20 has a central through hole 102 formed in its center to pass therethrough vertically. The top end of the central through hole 102 forms a small-diameter portion 102a that matches the small-diameter portion 72c of the top cover 16, and that can accommodate the head of the fixing screw 60 when the piston assembly 14 rises (see FIG. 2). The central through hole 102 has a large-diameter portion 102b connecting to the small-diameter portion 102a, and a ring-shaped third damper 104 is attached in the large-diameter portion 102b. As shown in FIG. 2, when the piston assembly 14 rises, the third damper 104 abuts on the inward flange 50 of the seal holder 38 and functions to alleviate the shock. The lower end of the large-diameter portion 102b is expanded in a tapered shape to form a ring-shaped protrusion 106, and the ring-shaped protrusion 106 can fit into the ring-shaped recess 51 of the seal holder 38 when the piston assembly 14 rises.

The top surface of the latch yoke 20 has a ring-shaped groove 108 formed therein (see FIG. 3), and a plurality of second air supply/discharge holes 110 extend from the bottom surface of the ring-shaped groove 108 to the lower surface of the latch yoke 20. The other end of the second port 76, which opens in the second step surface 72e of the top cover 16, faces this ring-shaped groove 108. That is, the second port 76 communicates with the cylinder hole 24 through the ring-shaped groove 108 and the second air supply/discharge holes 110 of the latch yoke 20.

The space in the cylinder tube 12 is divided into a first pressure chamber 112 existing below the piston seal 46 of the seal holder 38 and a second pressure chamber 114 existing above the piston seal 46 of the seal holder 38. The first port 26 communicates with the first pressure chamber 112 through the first air supply/discharge hole 28 and the slits 98a of the second damper 98, and the second port 76 communicates with the second pressure chamber 114 through the ring-shaped groove 108 and the second air supply/discharge holes 110 of the latch yoke 20.

The magnetic chuck 10 of the embodiment is constructed basically as explained above. Next, functions of the magnetic chuck 10 will be described mainly referring to FIGS. 7A to 9. As shown in FIG. 2, it is assumed that the piston assembly 14 is at top dead center (top end) in the initial state.

Figure 7A:
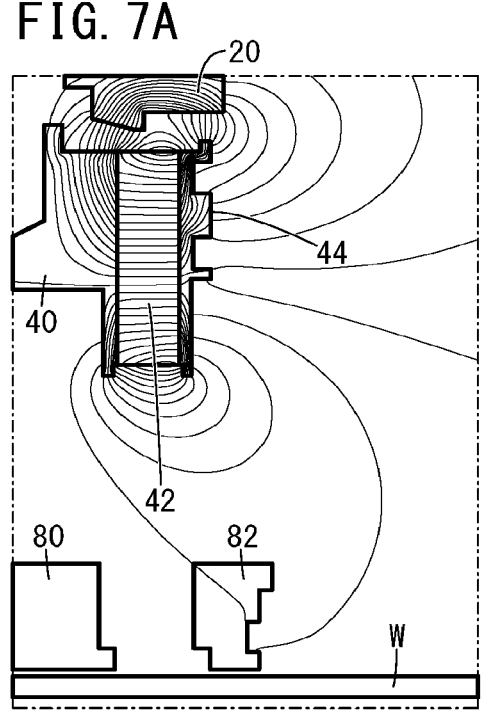
FIG. 7A is a diagram showing magnetic flux lines that are produced when the piston assembly of the magnetic chuck of FIG. 1 is at top dead center.

FIG. 7A shows magnetic flux lines in the initial state. The drawings showing magnetic flux lines, including FIG. 7A, are based on computer calculations. For convenience, among the components constituting the magnetic chuck 10, the drawings showing magnetic flux lines illustrate only the outlines of the permanent magnet 42 and the ferromagnetic bodies (core yoke 40, cover yoke 44, bottom yoke 80, outer yoke 82, and latch yoke 20).

A large number of the magnetic flux lines coming out from the inner side of the permanent magnet 42, which is the north pole, pass through the core yoke 40, the latch yoke 20, and the cover yoke 44, and return to the outer side of the permanent magnet 42 that is the south pole. On the other hand, there are few magnetic flux lines that return to the permanent magnet 42 via the bottom yoke 80 or the outer yoke 82 that are spaced apart from the permanent magnet 42. The piston assembly 14 including the permanent magnet 42 is attracted by the latch yoke 20 by a certain magnetic attraction force.

During transportation before the magnetic chuck 10 is brought into use, for example, the piston assembly 14 is held in the position of top dead center by the function of the latch yoke 20, even though no air is being supplied to the magnetic chuck 10. It is thus possible to avoid the unexpected situation in which the magnetic chuck 10 attracts neighboring iron materials etc., which ensures safety.

In the initial state, a robot not shown, for example, is driven to bring the magnetic chuck 10 close to the iron plate (workpiece) W to be attracted, and the second housing 100 is made to abut on the plate W. At the same time, a selector valve (not shown) is operated to supply air into the second pressure chamber 114 from the second port 76, and discharge the air in the first pressure chamber 112 from the first port 26.

The force to drive the piston assembly 14 downward by the differential pressure between the second pressure chamber 114 and the first pressure chamber 112 exceeds the magnetic attraction force acting between the latch yoke 20 and the piston assembly 14 at the top dead center of the piston assembly 14, causing the piston assembly 14 to start descending.

As the piston assembly 14 descends, the magnetic attraction force acting between the latch yoke 20 and the piston assembly 14 gradually becomes smaller, while the magnetic attraction force acting between the bottom yoke 80 or outer yoke 82 and the piston assembly 14 becomes larger gradually. When the latter magnetic attraction force exceeds the former magnetic attraction force, then the force to cause the piston assembly 14 to descend becomes the force based on the differential pressure between the first pressure chamber 112 and the second pressure chamber 114 plus the difference between the latter magnetic attraction force and the former magnetic attraction force.

Figure 7B:
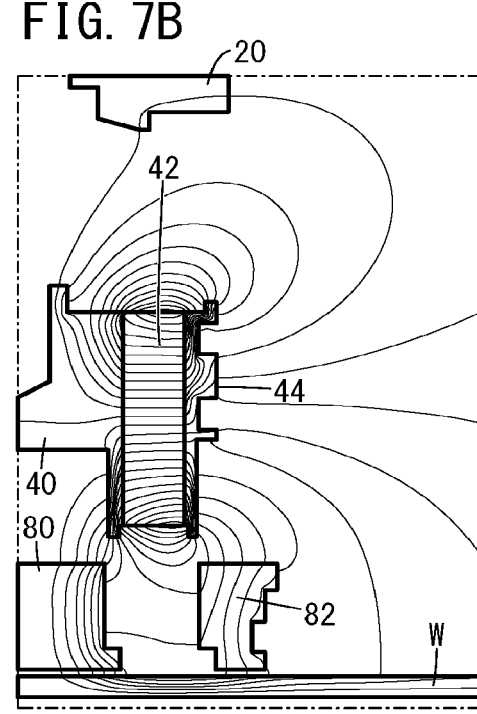
FIGS. 7B and 7C are diagrams showing magnetic flux lines that are produced when the piston assembly is in certain positions, respectively.

FIG. 7B shows the magnetic flux lines that are produced when the piston assembly 14 is located closer to the bottom yoke 80 than to the latch yoke 20.

A large number of the magnetic flux lines coming out from the inner side of the permanent magnet 42 return to the outer side of the permanent magnet 42 at least through the bottom yoke 80 or the outer yoke 82. On the other hand, few magnetic flux lines return to the permanent magnet 42 through the latch yoke 20. The magnetic flux lines returning to the permanent magnet 42 through the bottom yoke 80 or the outer yoke 82 mainly include three paths below.

The first path comes out from the permanent magnet 42, passes sequentially through the core yoke 40, the bottom yoke 80, the plate W, the outer yoke 82, and the cover yoke 44, and returns to the permanent magnet 42. The second path comes out from the permanent magnet 42, passes sequentially through the core yoke 40, the bottom yoke 80, the outer yoke 82, and the cover yoke 44, and returns to the permanent magnet 42. The third path comes out from the permanent magnet 42, passes sequentially through the core yoke 40, the outer yoke 82, and the cover yoke 44, and returns to the permanent magnet 42. The plate W is included in the first path and hence experiences the magnetic attraction force from the magnetic chuck 10.

Figure 7C:
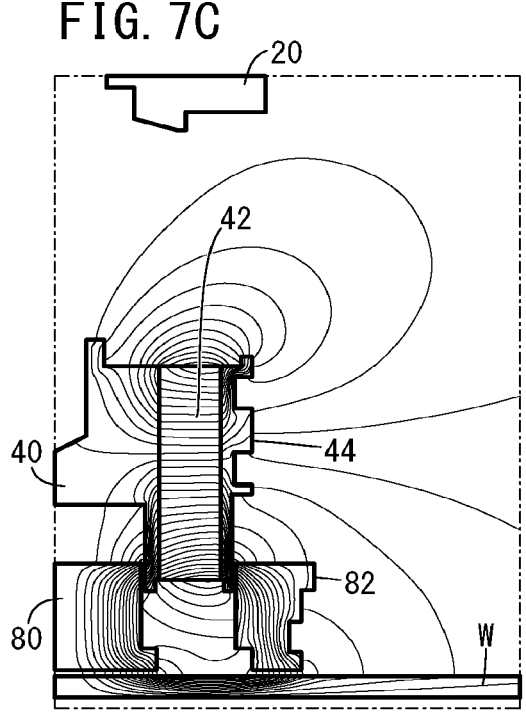
Figure 7D:
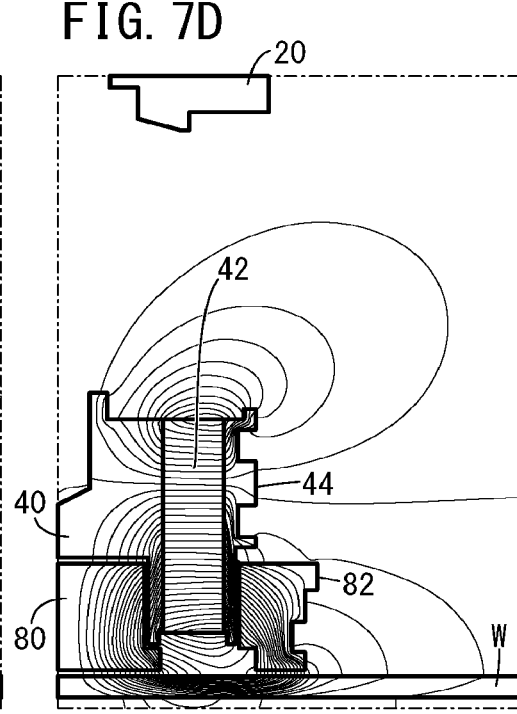
FIG. 7D is a diagram showing magnetic flux lines that are produced when the piston assembly is at bottom dead center.

As the piston assembly 14 further descends, the bottom yoke 80 fits into the recess 56 of the core yoke 40. Then, the step 65 of the cover yoke 44 abuts on the second damper 98, and the first damper 58 abuts on the bottom yoke 80, whereby the piston assembly 14 reaches the bottom dead center (bottom end). FIG. 7C shows the magnetic flux lines that are produced when the bottom yoke 80 starts fitting into the recess 56 of the core yoke 40. FIG. 7D shows the magnetic flux lines that are produced when the piston assembly 14 has reached the bottom dead center.

As can be understood from the diagrams, when the piston assembly 14 is in the vicinity of the bottom dead center, most of the magnetic flux lines coming out from the permanent magnet 42 and returning to the permanent magnet 42 pass sequentially through the core yoke 40, the bottom yoke 80, the plate W, the outer yoke 82, and the cover yoke 44.

More specifically, the magnetic flux lines coming out from the inner peripheral surface of the permanent magnet 42 pass through the inside of the core yoke 40 or the bottom yoke 80 while changing their directions downward, and enter the plate W while increasing the magnetic flux density. Then, the magnetic flux lines come out upward from the plate W and pass through the outer yoke 82 and the cover yoke 44, and then return to the outer peripheral surface of the permanent magnet 42. An increased magnetic flux density of the magnetic flux lines entering the plate W means a larger magnetic attraction force acting on the plate W. The magnetic flux density passing through the plate W becomes maximum when the piston assembly 14 is at bottom dead center, and so the plate W is attracted and held by the magnetic chuck 10 with the maximum magnetic attraction force.

Now, when the piston assembly 14 is at bottom dead center, a large number of the magnetic flux lines coming out from the core yoke 40 and entering the bottom yoke 80 extend in substantially a horizontal direction from the wall surface of the recess 56 of the core yoke 40. The horizontal components of the magnetic flux lines cancel out in the entire circumferential direction and does not contribute to the magnetic attraction force acting between the core yoke 40 and the bottom yoke 80. Further, most of the magnetic flux lines coming out from the outer yoke 82 and entering the cover yoke 44 extend in substantially a horizontal direction in the small-diameter portion 66 of the cover yoke 44. The horizontal components of the magnetic flux lines cancel out in the entire circumferential direction and does not contribute to the magnetic attraction force acting between the cover yoke 44 and the outer yoke 82. That is, in the vicinity of the bottom dead center of the piston assembly 14, the outer yoke 82 faces the piston assembly 14, including the cover yoke 44, on the outer peripheral side of the piston assembly 14, and the bottom yoke 80 fits into the recess 56 of the core yoke 40, which weakens the force by which the piston assembly 14 is attracted by the bottom yoke 80 and the outer yoke 82.

With the magnetic chuck 10 attracting and holding the plate W at the bottom dead center position of the piston assembly 14, the plate W is conveyed to a given position. Then, in order to release the plate W, a selector valve (not shown) is operated to supply air into the first pressure chamber 112 from the first port 26 and discharge the air in the second pressure chamber 114 from the second port 76.

The force to drive the piston assembly 14 upward by the differential pressure between the first pressure chamber 112 and the second pressure chamber 114 exceeds the magnetic attraction force that acts between the bottom yoke 80 and the outer yoke 82, and the piston assembly 14 at and near the bottom dead center of the piston assembly 14, and then the piston assembly 14 rises. As stated above, the magnetic attraction force acting between the bottom yoke 80 and the outer yoke 82, and the piston assembly 14 in the vicinity of the bottom dead center of the piston assembly 14 is weakened, and therefore the air pressure required to raise the piston assembly 14 can be made smaller accordingly.

The rise of the piston assembly 14 is stopped when the inward flange 50 of the seal holder 38 abuts on the third damper 104. That is, the piston assembly 14 reaches the top dead center. The magnetic attraction force acting on the plate W gradually becomes smaller in the course of the rising motion of the piston assembly 14, and the plate W is thus freed from the attraction. The piston assembly 14 is reliably held in the position of the top dead center because the differential pressure between the first pressure chamber 112 and the second pressure chamber 114 continuously acts in addition to the effect of the latch yoke 20. This eliminates the fear that the piston assembly 14 might descend unexpectedly and attract the plate W.

Figure 8:
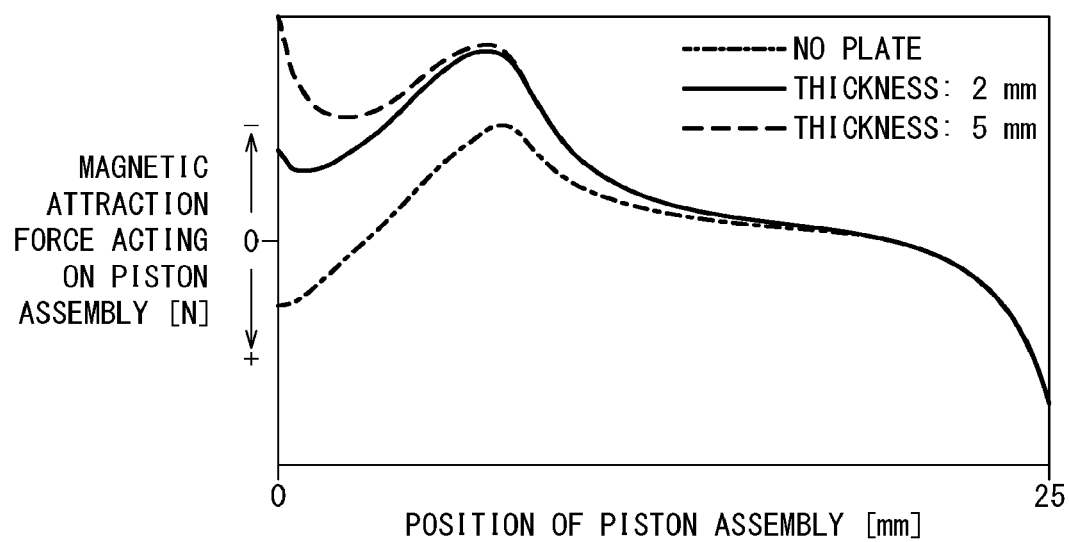
FIG. 8 is a diagram illustrating, for the magnetic chuck of FIG. 1, a relationship between the position of the piston assembly and the magnitude of the magnetic attraction force that acts on the piston assembly.

FIG. 8 illustrates a relationship between the position of the piston assembly 14 and the magnitude of the magnetic attraction force acting on the piston assembly 14, in the cases of no plate W, a plate W with a thickness of 2 mm, and a plate W with a thickness of 5 mm. The position of the piston assembly 14 is represented as the travel distance of the piston assembly 14 from the bottom dead center, with zero position indicating the position of the piston assembly 14 at the bottom dead center. In the embodiment, the position of the piston assembly 14 is 25 mm when the piston assembly is at the top dead center. As to the magnetic attraction force, "plus" denotes an upward force and "minus" denotes a downward force. That is, the force is plus when the piston assembly 14 is being attracted by the latch yoke 20, and the force is minus when the piston assembly 14 is being attracted by the bottom yoke 80 or the outer yoke 82.

As can be seen from FIG. 8, when the piston assembly 14 is at top dead center, the upward magnetic attraction force acting on the piston assembly 14 is maximum. As the piston assembly 14 descends from the top dead center, the upward magnetic attraction force becomes smaller, and the magnetic attraction force takes a peak value after the direction of the magnetic attraction force has changed to the downward direction. In the absence of the plate W and in the presence of a 2-mm-thick plate W, the downward magnetic attraction force becomes maximum when it takes the peak value.

Figure 9:
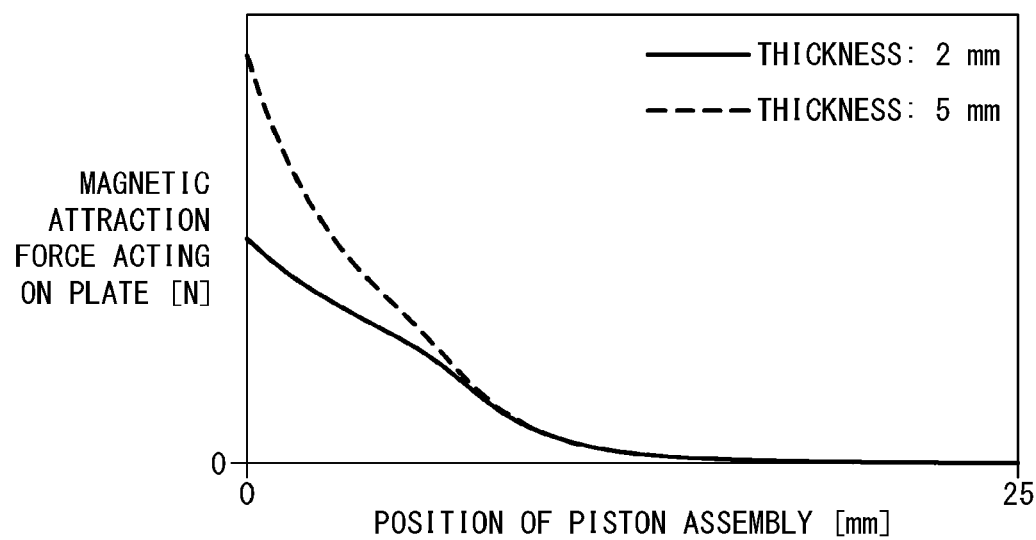
FIG. 9 is a diagram illustrating, for the magnetic chuck of FIG. 1, a relationship between the position of the piston assembly and the magnitude of the magnetic attraction force that acts on a plate.

On the other hand, FIG. 9 illustrates a relationship between the position of the piston assembly 14 and the magnitude of the magnetic attraction force acting on the plate W, in the cases of a plate W with a thickness of 2 mm, and a plate W with a thickness of 5 mm. As can be seen from FIG. 9, the magnetic attraction force acting on the plate W is almost zero until the piston assembly 14 descends from the top dead center to a certain distance, and then it becomes larger as the piston assembly 14 further descends. The magnetic attraction force acting on the plate W becomes maximum at the bottom dead center of the piston assembly 14.

According to the embodiment, the core yoke 40, as a ferromagnetic body, is provided on the side of the inner periphery of the permanent magnet 42, and therefore the magnetic flux from the permanent magnet 42 can be concentrated and the magnetic attraction force acting on the workpiece can be increased.

Second Embodiment

Figure 10:
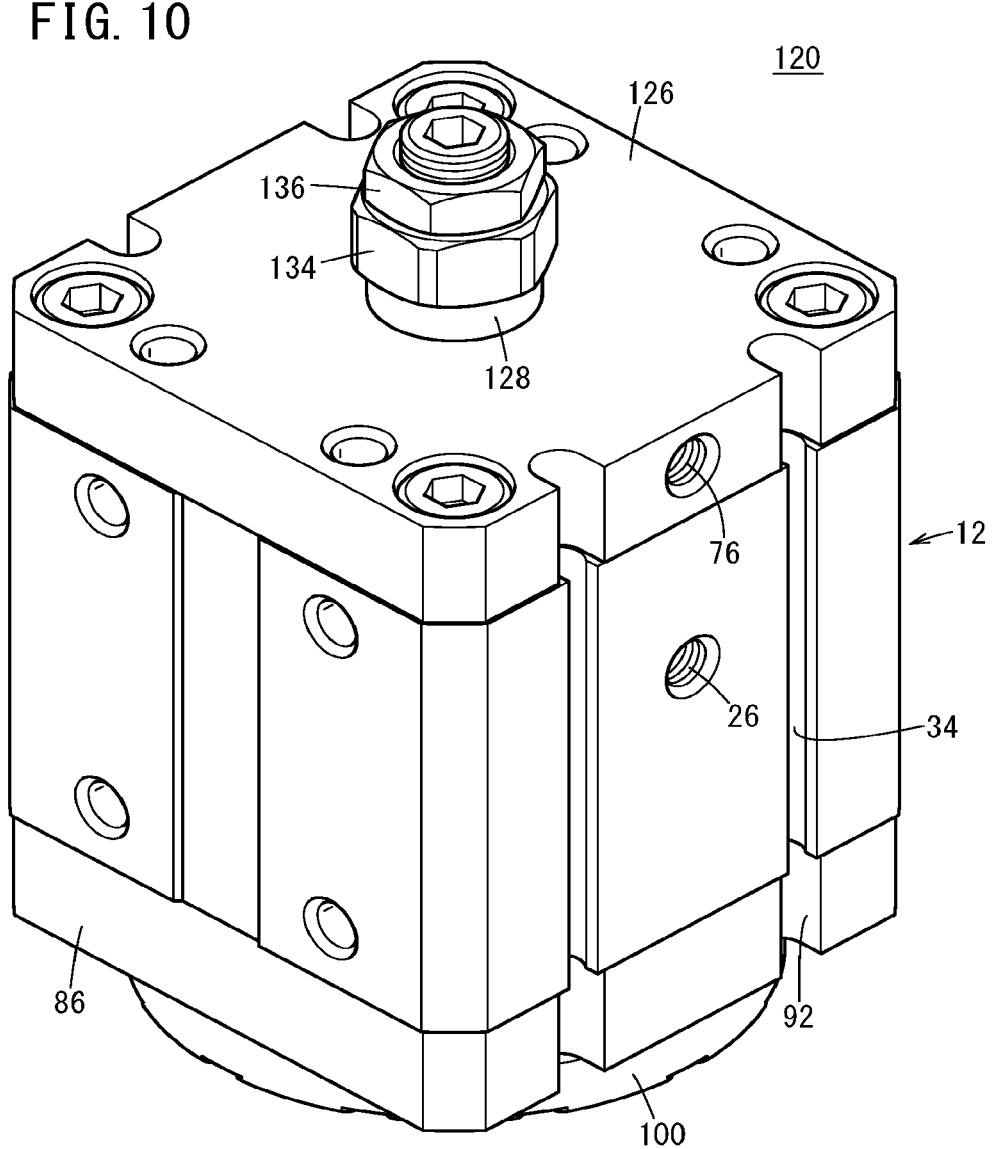
FIG. 10 is a perspective view of a magnetic chuck according to a second embodiment of the present invention.
Figure 11:
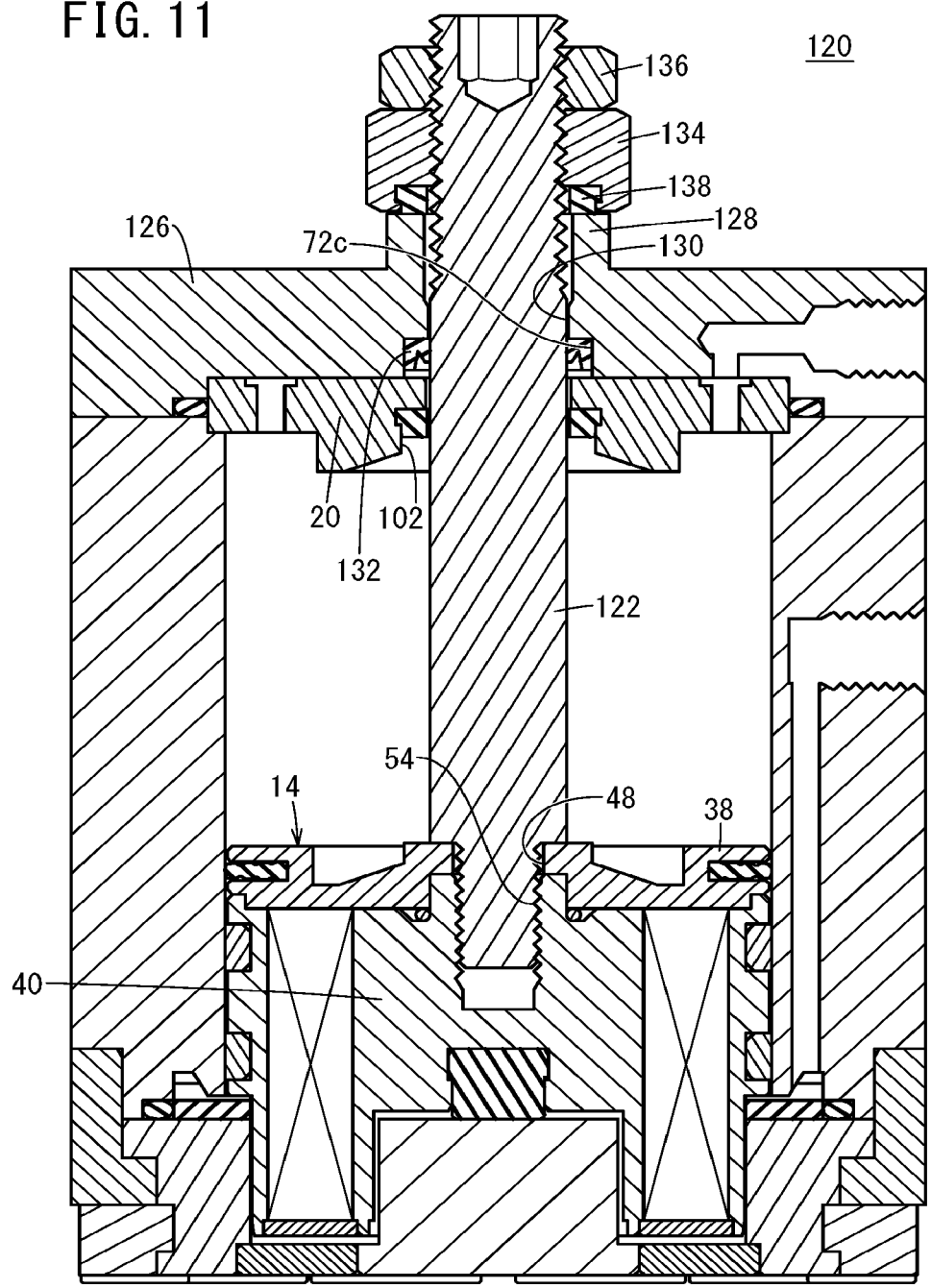
FIG. 11 is a longitudinal section of the magnetic chuck of FIG. 10.

Next, a magnetic chuck 120 according to a second embodiment of the present invention will be described referring to FIGS. 10 and 11. The second embodiment differs from the first embodiment in that a long rod 122 is joined to the piston assembly 14 and an adjuster capable of adjusting the position of the movement end of the piston assembly 14 is attached to an exposed end portion of the rod 122. The constituent features of the magnetic chuck 120 of the second embodiment that are the same as or equivalent to those of the above-described magnetic chuck 10 will be labeled with the same reference numerals and will not be described in detail again.

A tubular protrusion 128 is provided in the center of the top surface of a top cover 126. In the center of the top of the top cover 126 including the tubular protrusion 128, a center hole 130 is formed to continue to the small-diameter portion 72c of the circular recess 72, and the rod 122 is inserted and supported in the center hole 130. A rod packing 132 abutting on the rod 122 is attached in the small-diameter portion 72c of the circular recess 72, so as to provide a seal between the top cover 126 and the rod 122.

The lower end of the rod 122 passes through the through hole 48 of the seal holder 38 and is screwed into the threaded hole 54 of the core yoke 40. The upper end of the rod 122 extends through the central through hole 102 of the latch yoke 20 and the center hole 130 of the top cover 126 to outside. The rod 122 is made of a paramagnetic metal such as an aluminum alloy.

An adjuster nut 134 and a lock nut 136 are engaged with an external thread formed on an upper end portion of the rod 122. That is, the adjuster nut 134 is attached in a suitable position on the upper end side of the rod 122 and the lock nut 136 fixes it in that position. A seat member 138 having elasticity is attached in the lower surface of the adjuster nut 134. The adjuster nut 134, the lock nut 136, and the seat member 138 constitute the adjuster.

From the state in which the piston assembly 14 is at top dead center, in order to attract the plate W, air is supplied into the second pressure chamber 114 from the second port 76 and the air in the first pressure chamber 112 is discharged from the first port 26, causing the piston assembly 14 to descend. The descending motion of the piston assembly 14 stops when the seat member 138 attached to the rod 122 abuts on the tubular protrusion 128 of the top cover 126.

In this way, the position of the bottom dead center of the piston assembly 14 can be adjusted by changing the position in which the adjuster nut 134 is attached to the rod 122, to thereby adjust the magnitude of the magnetic attraction force for attracting and holding the plate W. The relationship between the position of the piston assembly 14 and the magnitude of the magnetic attraction force acting on the plate W is as shown in FIG. 9.

According to the embodiment, it is possible to attract and hold the plate W with a magnetic attraction force suitably adjusted according to the weight etc. of the plate W to be held by attraction. It is also possible, when a plurality of plates W are piled up, to attract and hold the plates W one by one by adjusting the magnetic attraction force. The adjuster of the embodiment is formed of the adjuster nut 134, the lock nut 136, and the seat member 138, but the configuration of the adjuster is not limited to this configuration.

The magnetic chuck of the present invention is not limited to the embodiments described above, but can of course adopt various configurations without departing from the essence and gist of the present invention.

The invention claimed is:

1. A magnetic chuck in which a piston assembly including a tubular permanent magnet and a core yoke is provided movably inside a cylinder tube by supplying and discharging air, wherein
the permanent magnet is provided around the core yoke and is magnetized in a radial direction, and
a rod is joined to the piston assembly, an adjuster configured to adjust a position of a movement end of the piston assembly is provided at an end portion of the rod that is exposed to outside, and the adjuster includes an adjuster nut engaged with a thread formed on the rod.

2. The magnetic chuck according to claim 1, wherein the permanent magnet is configured by combining a plurality of magnet pieces.

3. The magnetic chuck according to claim 1, wherein a cover yoke is provided around the permanent magnet.

4. The magnetic chuck according to claim 1, wherein a latch yoke that faces the piston assembly is provided at another end in an axial direction of the cylinder tube.

5. A magnetic chuck in which a piston assembly including a tubular permanent magnet and a core yoke is provided movably inside a cylinder tube by supplying and discharging air, wherein
the permanent magnet is provided around the core yoke and is magnetized in a radial direction, and
a rod is joined to the piston assembly, an adjuster configured to adjust a position of a movement end of the piston assembly is provided at an end portion of the rod that is exposed to outside, wherein an outer yoke that faces an outer periphery of the piston assembly at a movement end of the piston assembly is provided at one end in an axial direction of the cylinder tube.

6. The magnetic chuck according to claim 5, wherein a bottom yoke that faces the core yoke is also provided at one end in an axial direction of the cylinder tube.

7. A magnetic chuck in which a piston assembly including a tubular permanent magnet and a core yoke is provided movably inside a cylinder tube by supplying and discharging air, wherein
the permanent magnet is provided around the core yoke and is magnetized in a radial direction, and
a rod is joined to the piston assembly, an adjuster configured to adjust a position of a movement end of the piston assembly is provided at an end portion of the rod that is exposed to outside,
wherein a bottom yoke that faces the core yoke is provided at one end in an axial direction of the cylinder tube.

8. The magnetic chuck according to claim 7, wherein the bottom yoke fits into a recess of the core yoke at a movement end of the piston assembly.

* * * * *